May 19, 1959
E. F. W. MOELTZNER
2,886,836
MACHINE FOR SIMULTANEOUSLY OPERATING ON
OPPOSITE ENDS OF A WORKPIECE
Filed Dec. 18, 1953
2 Sheets-Sheet 1
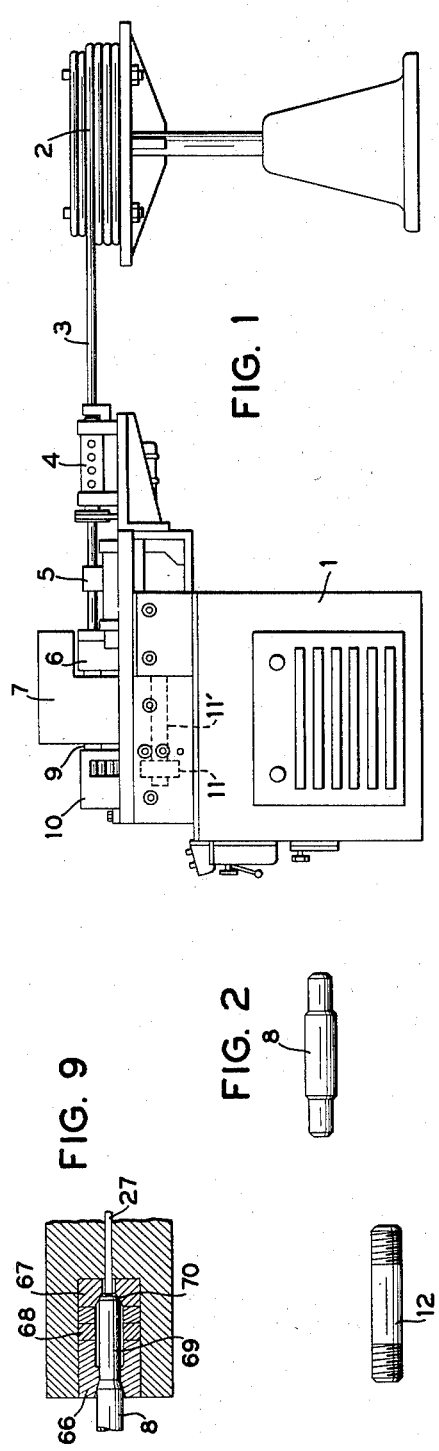
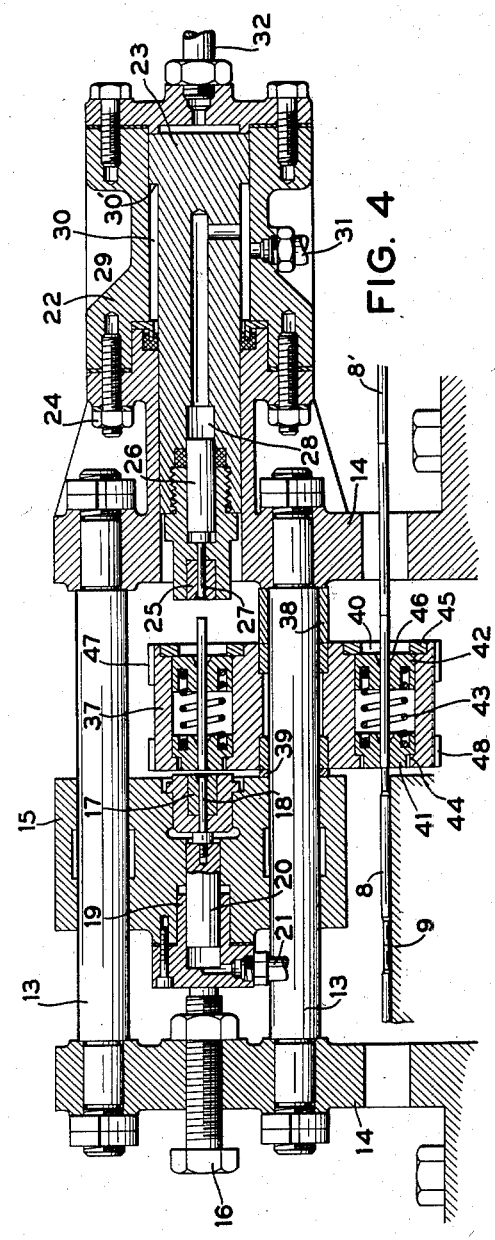
INVENTOR
ERNST FRITZ WILHELM MOELTZNER
BY *Strauch, Nolan & Diggins*
ATTORNEYS

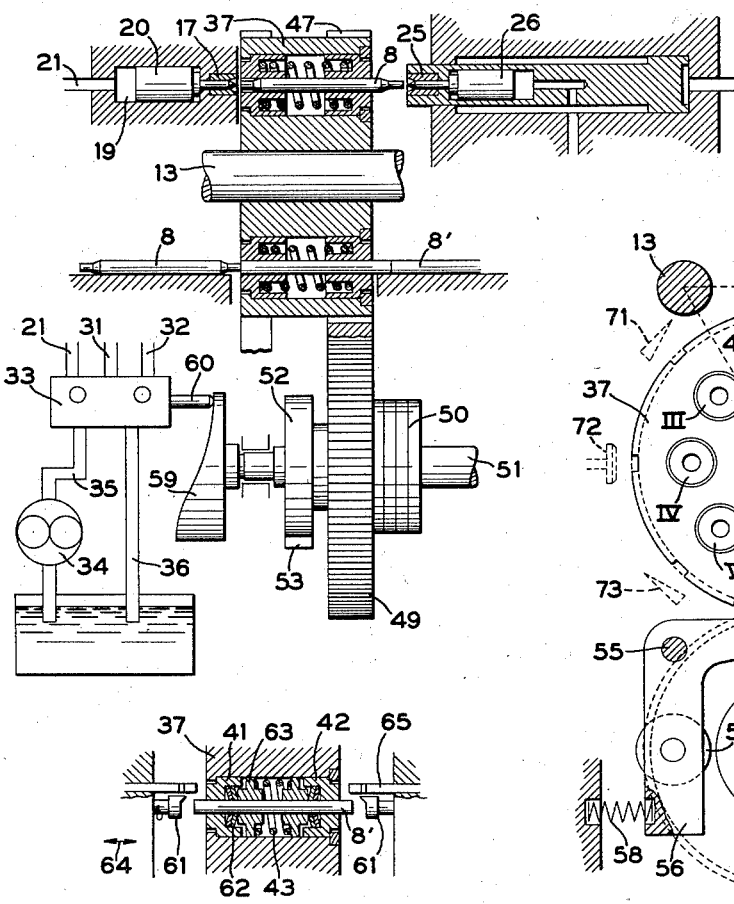
FIG. 6
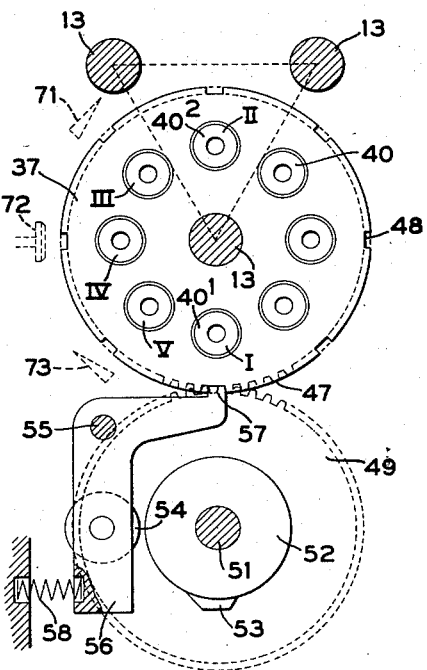
FIG. 7
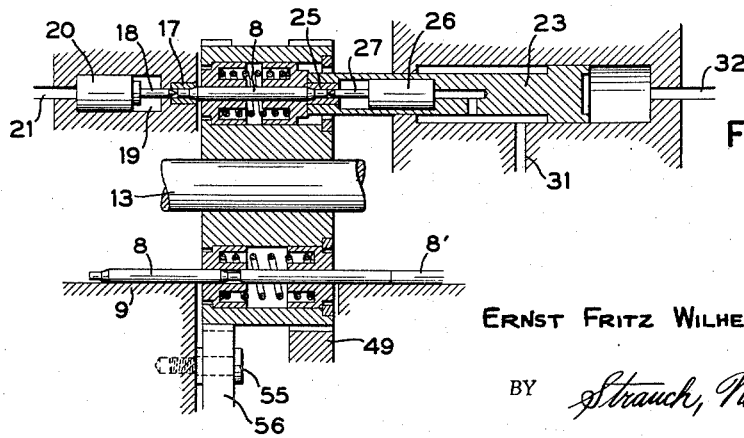
FIG. 8
FIG. 5
INVENTOR
ERNST FRITZ WILHELM MOELTZNER
BY Strauch, Nolan & Diggins
ATTORNEYS

United States Patent Office 2,886,836
Patented May 19, 1959

2,886,836

MACHINE FOR SIMULTANEOUSLY OPERATING ON OPPOSITE ENDS OF A WORKPIECE

Ernst Fritz Wilhelm Moeltzner, Berlin-Charlottenburg, Germany, assignor, by mesne assignments, to Landis Machine Company, Waynesboro, Pa., a corporation of Pennsylvania Application December 18, 1953, Serial No. 399,129

Claims priority, application Germany December 24, 1952

10 Claims. (Cl. 10—2)

The invention concerns a mechanism for manufacturing cylindrical work pieces from smooth wire or bars for producing studs, headless screws or the like. The present invention is an improvement on the invention disclosed in application Serial No. 372,373 filed August 4, 1953, for Method and Apparatus for Producing Cylindrical Workpieces, now abandoned, in which the work blanks, cut off by a shearing tool, are shaped by deforming tools and are carried, by a feeding means, between the rolling tools of a rolling machine, preferably a thread rolling machine.

In the production of studs, the requirement is very frequently made that the body diameter shall be equal to the major diameter of the threads on both ends, so that the stud has an acceptable fit over its whole length. Since the thread increases in size during rolling, the ends of the work blank which are to be threaded must be formed to a diameter smaller than that of the body. In the aforesaid application Serial No. 372,373 it is proposed to reduce one or both of the threaded ends by an extrusion operation effective axially of the work piece.

This invention is concerned with the development of such an extrusion mechanism and is distinguished by the fact that a hydraulic extrusion mechanism provided with plungers, dies and ejectors, and operating with an intermittently rotating transfer mechanism, is mounted in the feeder between the shearing tool and the rolling tools, said plungers moving in the direction of the axis of the work blank held in the transfer mechanism which receives the work blank from the chute, transfers it to the extruding mechanism and delivers it back to the chute after it has been ejected from the extruding mechanism. In comparison with the known method of reducing the body of the stud by means of wedge-shaped surfaces, formed as segments on the threading rolls, this invention has the advantage of considerably greater accuracy. Furthermore, no part of the rolling path of the thread profile on the roll is lost. Thus work pieces of larger diameters than heretofore can be rolled by so-called segment rolls in a maximum of one revolution of the rolling tools. The greater accuracy obtained relates to the complete freedom from shock of the work pieces produced, which are not subjected to any bending stresses during the deforming process since the extrusion pressure is effective in the axial direction. The extrusion is effected in the cold condition with an accuracy of one thousandth of a millimeter.

A suitable embodiment of the invention is one in which the transfer mechanism comprises a drum provided with a plurality of concentric openings and rotating intermittently in the operating cycle of the machine and one opening is disposed in the chute and another in the axis of the matrices of the extruding mechanism. This construction of the mechanism makes it possible to operate the machine with or without extruding means. Since only the intermittently rotating transfer mechanism is inserted in the work feeding means, the length of the machine in the direction of the wire needs to be increased only by the length of one work piece.

A further object of the invention is to provide the extruding mechanism with a plurality of cylindrical tie rods, wherein a guiding body carrying the stationary die and the hydraulic ejector piston, is guided on the tie rods, which are formed as cylindrical ways; and the drum is rotatably mounted on one of these cylindrical ways and both body and drum are axially movable and adjustable for different work piece lengths. In order to determine the extruded length of the workpiece, which can be different on the two ends, a suitable embodiment of the invention is one in which the ejector pistons are connected to interchangeable push rods which, in their withdrawn end positions inside the dies, limit the extruded length of the work piece. In this way and with simple means, the material is prevented from shooting through during the extruding operation. This advantage is particularly apparent when the deformation on one end of the work piece is less than on the other.

The necessary control of the ejector piston after termination of the extrusion operation can be achieved by causing the extruding plunger to have a smaller piston surface for contact by the hydraulic fluid for the retracting movement and to have a cylinder for the ejector piston, both pistons having a common pressure line.

In order to avoid interfering with the rotation of the drum as it indexes, the extruded work piece should first be pushed out of the stationary die. For this reason the ejector piston in the guiding body has a larger piston area than the ejector piston in the extruding plunger.

In the case of longer work pieces, it is desired that the work pieces be supported without difficulty over almost their entire length. This can be suitably achieved if the openings in the drum comprise two guide bushings, movable toward each other, contacted by a resetting spring and having clamping means and bores, with conical entrances, corresponding to the diameter of the work blank. A considerable simplification of the indexing mechanism for the drum can be achieved by causing the drum to have a ring gear and locking means and to engage a gear driven through a friction mechanism while a rotating cam disk, driven by the main drive shaft which carries the rolling tool, actuates a locking lever which is under spring pressure, releases the drum locking means and, after rotation, locks it in the new indexed position. The cam disk is driven either directly or through a countershaft, from the operating shaft which carries the rolling tool. The hydraulic control of the extruding plunger and the ejector pistons is effected by a hydraulic reversing valve operating in sequence with the machine. Thus it is possible to return the extruded work piece to the chute without interfering with the work piece succession, wherein the leading work piece of those not yet extruded pushes the extruded work piece out of the drum opening and is itself brought into extruding position when the drum indexes again.

Preferably the work pieces are chamfered. Therefore, chamfering tools are mounted within reach of the work pieces supported in the drum, for endwise operation on the work pieces. Chamfering of the work pieces can also be effected by extrusion in the dies, so that the tools then machine only the end surface of the work pieces. This machining operation may also be eliminated, since, in many cases, the chamfered work piece, as it leaves the extruding mechanism, satisfies the requirements.

Furthermore it is advantageous that the extruding mechanism with the hydraulic ejector pistons and the transfer mechanism form a unit which is adaptable to the type of bed construction used. Since the extruding mechanism engages the work piece series only with the drum of the transfer mechanism, the length of the structure is changed very little by the insertion of the unit. The length of the chute is increased only slightly.

The subject matter of the invention is illustrated in the drawings on an exemplary thread rolling machine. In the drawings, Figure 1 is a side elevation of a thread rolling machine with wire reel and extrusion mechanism.

Figure 2 shows an extruded work piece for the stud of Fig. 3,

Figure 3 shows the stud manufactured from the wire,

Figure 4 shows the extrusion mechanism with feeding drum, in section,

Figure 5 shows the plunger of the extruding mechanism in its pressing position,

Figure 6 shows the position of the plunger of the extruding mechanism when the work piece is pushed out, Figure 7 is an elevation of the feeding drum with locking mechanism and drive, Figure 8 shows a detail of Fig. 7, and Figure 9 shows a die for simultaneously chamfering the work piece.

The thread rolling machine 1 works from the reel 2. The wire 3 passes through the straightening mechanism 4, is intermittently advanced by the feeding mechanism 5 and is cut to accurate lengths in the shearing mechanism 6. The work blank 8' is fed to the extruding mechanism 7. The extruded work piece 8 is advanced in the chute 9 and arrives in the magazine 10 and thence it arrives between the rolling tools 11 which are mounted on the drive shafts 11'. The rolls 11 are preferably formed as segment rolls and roll the threads on both ends of the extruded work piece in one revolution or less. The major diameters of the threads are equal to the body diameter of the stud.

The extruding mechanism 7 has three cylindrical tie rods 13 which are formed as rails and which absorb the extruding pressure. The wall portions 14 are flange-mounted on the frame of the thread rolling machine. The guiding body 15 is movable on the rails and is supported centrally by the set screw 16. The body 15 receives the die 17, which is entered by the push rod 18 of the hydraulic ejector. This comprises a cylinder 19 secured to the body 15; the piston 20 moves in the cylinder 19 and an interchangeable push rod 18 is screwed into the piston. The hydraulic line to cylinder 19 is denoted by 21.

The cylinder 22 with the extruding plunger 23 is secured by screws 24 to the opposite wall 14. The plunger receives the die 25 and the ejector piston 26 with the interchangeable push rod 27. The ejector piston 20 has a somewhat greater area than the ejector piston 26. The cylinder bore for the piston 26 is designated by 28. It is connected by line 29 to the annular chamber 30 to which the hydraulic line 31 is connected. The annular chamber 30 is formed by the body of the plunger 23 and is bounded on the right side by the annular plunger surface 30'. The hydraulic line 32 is connected to the cylinder 22 of the extruding plunger. The lines 21, 31 and 32 lead to the control box 33 and are connected, by reversing valves, to the pressure line 35 leading from the extrusion mechanism pump 34 or to the discharge line 36.

The transfer mechanism comprises the drum 37 which is rotatably journalled on a rail 13 and whose distance from the guiding body 15 is adjustable by spacing bushings 38 and 39. The drum is provided with a plurality of openings 40 arranged concentric with the axis of rotation. Each opening contains two guide bushings 41 and 42, movable toward each other, which are contacted by the compression spring 43 and which are stopped by the abutment 44 and retaining ring 45. The guide bushings have conical mouths 46 leading in from the entrance side. The ring gear 47 and latching means 48 for each opening 40 are arranged on the circumference of the drum 37. The gear 49 meshes with the ring gear 47 and is connected to the drive shaft 51 through a friction clutch such as the disk clutch 50. The drive shaft 51 drives the cam disk 52 and rotates in synchronism with the main drive shaft 11'. The cam 53 strikes the roller 54 of the locking lever 56 which is rockable about the pin 55 and whose locking projection 57 engages the notches 48 under the force of the spring 58. The shaft 51 drives a cam 59 which contacts the pin 60 of the reversing mechanism 33 and which causes corresponding displacement of the control valve spool.

For chamfering the work blank or the extruded work piece, chamfering tools (61) are mounted on both sides of the drum 37 (Fig. 8). High speed cutter heads can be used for this purpose. Expanding spring disks 62 serve to clamp the work piece in the guide bushings 41, 42. The spring disks 62 are mounted between a guide bushing and the pressure ring 63, against which the spring 43 presses. The rotating tools 61 are reciprocated in the direction of the arrow 64. Thus the guide bushings are contacted by the abutments 65 and moved toward each other, so that the spring disks 62 clamp the work piece when the pressure rings 63 press against each other.

Another embodiment of the matrix is shown in Fig. 9 and here the matrix consists of two dies 66 and 67 with a spacing ring 68. The die 66 serves to extrude the portion 69, whose diameter corresponds to the pre-machined diameter. The die 67 serves to form the chamfer 70. So that the work piece does not shoot into the bore of the die 67 during extrusion, the work piece is stopped by the ejector pin 27 which is introduced into the die.

In Fig. 7, the position of the drum 37, in which the opening $40^1$ lies in the axis of the chute, is designated by I and the station in which the opening $40^2$ lies in the axis of the extruding mechanism is designated by II. At station III cams 71 are arranged in the path of the work piece and parallel to the end face of the drum. The cams 71 push the work piece into a position which is symmetrical to the chamfering tools for the following chamfering operation. Chamfering is effected at station IV by means of the cutter heads 61 (Fig. 8). In case the chamfer is pressed on (Fig. 9), face milling cutters 72 are mounted at station IV. At station V are cams 73, which push the extruded work piece 8 and the series of work pieces lying in front of this work piece in the chute 9, into the position in which the work piece lengthened by extrusion can be inserted accurately into the work piece series.

The manner of operation of the extrusion process is as follows:

The work blank 8', cut to accurate length by the shearing tool 6, is pushed by the advancing wire 3 on the chute 9 into the opening $40^1$ which stands at the level of the chute. The work blank assumes the position shown in Fig. 4 and, upon further rotation of the drum, arrives at the axis of the extruding mechanism. For the extruding operation, the lines 21 and 31 are without pressure while the line 32 is under pressure. The extruding plunger 23 moves into the position shown in Fig. 5, in which the ejector pistons 20 and 26 are pushed back, so that the push rods 18 and 27 limit the extruded length in the dies 17 and 25. The plunger 23 pushes the right hand guide bushing 42 back into its opening. After the extruding operation, the line 32 is connected to discharge and the pressure line is connected to the lines 21 and 31. The extruding plunger 23 is pushed back, by means of the hydraulic fluid flowing into the annular chamber 30, into the right hand end position shown in Fig. 6. Also, the piston 20, which has the larger piston area, pushes the work piece out of the die 17. The piston 26 receives the full oil pressure as soon as the plunger has reached its end position and pushes the work piece out of the die 25. This position of the plunger is shown in Figure 6. As soon as the drum 37 is unlocked, it is rotated one step forward through the friction clutch 50 and the gear 49 and the process repeats. When it arrives at the plane of the chute 9, the extruded work piece is again ejected by the succeeding work blank 8'.

I claim:

1. Mechanism for simultaneously extruding the opposite ends of a workpiece comprising, a pair of axially aligned dies, means forming a chute through which successive workpieces are passed, a transfer drum having a plurality of workpiece holders, means mounting said holders for movement axially of said drum, said holders being spaced around said drum to position one of said holders in alignment with said dies when another holder is in alignment with said chute, means for intermittently rotating said drum to carry a workpiece from said chute to said dies, means for moving one of said dies toward and away from the other of said dies to move said workpiece and said holders toward said other of said dies and force the ends of said workpiece into said dies, and means associated with each of said dies for ejecting the workpiece therefrom, said workpiece being carried back to said chute in the further rotation of said drum.

2. Apparatus for simultaneously extruding the opposite ends of a workpiece comprising a frame, a plurality of tie rods connecting spaced portions of said frame, a first forming die mounted on said tie rods for adjustment therealong, a piston carrying a second forming die, said piston being reciprocably mounted in a cylinder secured to one of said frame portions in axial alignment with said first die, and a transfer drum mounted for rotation on one of said tie rods and for axial adjustment therealong, said drum having workpiece holders adapted to be brought into axial alignment with said first and second forming dies.

3. Apparatus for simultaneously extruding the opposite ends of a workpiece comprising a frame, a plurality of tie rods connecting spaced portions of said frame, a chute in said frame along which a series of workpieces is adapted to pass, a first forming die mounted on said tie rods for adjustment therealong, a second forming die reciprocably mounted in one of said frame portions in axial alignment with said first die, a transfer drum mounted for rotation on one of said tie rods and for axial adjustment therealong, said drum having a plurality of workpiece holders spaced on said drum to position one of said holders in alignment with said dies when another holder is in alignment with said chute, and means for intermittently rotating said drum to carry a workpiece from said chute to said dies.

4. Apparatus for simultaneously extruding the opposite ends of a workpiece comprising a pair of axially aligned dies, one of said dies being rigid with an operating piston adapted to move said one die toward and away from the other die to extrude a workpiece positioned between said dies, said operating piston having an internal chamber, an ejector plunger adapted to extend through said one die, said plunger being rigid with an ejector piston reciprocably mounted in said chamber, and means adapted to connect one side of each of said pistons simultaneously to a source of fluid under pressure to move said one die away from said other die and to force said plunger through said one die to eject a workpiece therefrom.

5. The combination according to claim 4 together with an additional ejector plunger adapted to extend through said other die, said additional ejector plunger being rigid with an additional ejector piston, and means to connect said additional ejector piston to a source of fluid pressure when the other pistons are so connected.

6. The combination according to claim 5 wherein the effective area of said additional ejector piston is greater than the effective area of said ejector piston whereby said workpiece will be positively ejected from said other die before it is ejected from said one die.

7. The combination according to claim 1 wherein said work holders comprise a pair of bushings reciprocably mounted in said drum, said bushings having axially aligned workpiece supporting and receiving openings, and resilient means urging said bushings apart.

8. Mechanism for simultaneously extruding the opposite ends of a workpiece comprising a pair of axially aligned dies, means forming a chute through which successive workpieces pass, a transfer drum having a plurality of workpiece holders, said holders being spaced on said drum to position one of said holders in alignment with said dies when another holder is aligned with said chute, means for frictionally rotating said drum, means for positively locking said drum when one of said holders is in alignment with said dies, actuating means for moving one of said dies toward and away from the other of said dies to extrude the ends of said workpiece, control means for intermittently rendering the drum locking means ineffective, and means operable in timed relation with said control means for energizing said actuating means.

9. Mechanism for simultaneously forming the opposite ends of a workpiece comprising, a pair of spaced axially aligned dies, a pair of spaced axially aligned cutting tools, means forming a chute through which successive workpieces are passed, a transfer drum having a plurality of workpiece holders, said holders being spaced around said drum to position one of said holders in alignment with said dies when additional holders are in alignment with said cutting tools and with said chute, means for intermittently rotating said drum to carry a workpiece from said chute to said dies and from said dies to said cutting tools, means for locking said work piece against rotation when said work piece is opposite said cutting tools, means for moving one of said dies toward and away from the other of said dies to extrude the ends of said workpiece, and means associated with each of said dies for ejecting the workpiece therefrom to permit the workpiece to be carried past said cutting tools and returned to said chute in the further rotation of said drum.

10. In a mechanism for producing studs and the like from elongated stock, said mechanism including means for preforming said stock and means for roll forming said stock: means forming a chute having axially aligned sections respectively leading from said pre-forming means and toward said rolling means, an extrusion mechanism positioned intermediate said preforming means and said rolling means and off-set from said chute, and a rotating transfer means for delivering a section of said stock from said chute to said extrusion mechanism and for subsequently returning an extruded workpiece to said chute for delivery to said rolling means.

References Cited in the file of this patent

UNITED STATES PATENTS

| Number | Name | Date |
| --- | --- | --- |
| 126,495 | Seward | May 7, 1872 |
| 172,622 | Glazier | Jan. 25, 1876 |
| 268,037 | McDonald | Nov. 28, 1882 |
| 1,617,121 | Kaufman | Feb. 8, 1927 |
| 1,670,559 | Williams | May 22, 1928 |
| 2,128,705 | Hatebur | Aug. 30, 1938 |
| 2,162,891 | Johnson | June 20, 1939 |
| 2,303,662 | Schwartz et al. | Dec. 1, 1942 |
| 2,309,126 | Lundius | Jan. 26, 1943 |
| 2,680,860 | Friedman | June 15, 1954 |
| 2,768,394 | Ward | Oct. 30, 1956 |
| 2,786,217 | Johnson | Mar. 26, 1957 |